(12) United States Patent
Green et al.

(10) Patent No.: US 9,816,806 B2
(45) Date of Patent: Nov. 14, 2017

(54) DEFORMATION DETECTION TOOL AND METHOD FOR DETECTING DEFORMATION

(71) Applicant: SAFRAN LANDING SYSTEMS UK LTD, Gloucester, Gloucestershire (GB)

(72) Inventors: Chris Green, Churchdown (GB); Kay Green, Churchdown (GB)

(73) Assignee: Safran Landing Systems UK LTD (GB)

( * ) Notice: Subject to any disclaimer, the term of this patent is extended or adjusted under 35 U.S.C. 154(b) by 0 days.

(21) Appl. No.: 14/765,444

(22) PCT Filed: Feb. 4, 2014

(86) PCT No.: PCT/GB2014/050302
§ 371 (c)(1),
(2) Date: Aug. 3, 2015

(87) PCT Pub. No.: WO2014/118575
PCT Pub. Date: Aug. 7, 2014

(65) Prior Publication Data
US 2015/0369590 A1 Dec. 24, 2015

(30) Foreign Application Priority Data

Feb. 4, 2013 (GB) .................................. 1301918.7

(51) Int. Cl.
*G01B 11/24* (2006.01)
*G01B 11/16* (2006.01)
(Continued)

(52) U.S. Cl.
CPC ............ *G01B 11/16* (2013.01); *G01B 11/303* (2013.01); *G01B 11/306* (2013.01); *B64D 2045/008* (2013.01)

(58) Field of Classification Search
CPC ... G01J 3/02; G01J 3/0224; G01J 3/28; G01B 11/306; G01B 11/303; G01B 11/16
(Continued)

(56) References Cited

U.S. PATENT DOCUMENTS 3,517,550 A * 6/1970 Leventhal .............. G01G 19/07
73/764
6,203,168 B1 3/2001 Bahar
(Continued)

FOREIGN PATENT DOCUMENTS

CN 101625230 1/2010
DE 4225522 3/1993
(Continued)

OTHER PUBLICATIONS

International Preliminary Report on Patentability for International Application No. PCT/GB2014/050302 dated Aug. 4, 2015.
(Continued)

*Primary Examiner* — Tarifur Chowdhury
*Assistant Examiner* — Isiaka Akanbi
(74) *Attorney, Agent, or Firm* — RatnerPrestia

(57) ABSTRACT

A tool for detecting deformation of a nominally straight element includes a first body element having first straight edge, means for biasing the first straight edge against the straight element, and a light source arranged to illuminate any space present between the straight element and the first straight edge of the first body element.

4 Claims, 4 Drawing Sheets

(51) Int. Cl.
*G01B 11/30* (2006.01)
*B64D 45/00* (2006.01)

(58) Field of Classification Search
USPC ...... 356/601–614, 73, 237.5; 73/583, 864.71
See application file for complete search history.

(56) References Cited

U.S. PATENT DOCUMENTS

| | | | | |
|---|---|---|---|---|
| 6,512,577 | B1* | 1/2003 | Ozanich | G01J 3/02 |
| | | | | 209/588 |
| 6,513,255 | B1 | 2/2003 | Creekmore | |
| 6,847,447 | B2* | 1/2005 | Ozanich | G01J 3/02 |
| | | | | 209/588 |
| 8,042,765 | B1* | 10/2011 | Nance | B64C 25/00 |
| | | | | 244/100 R |
| 2009/0265120 | A1 | 10/2009 | OBrien | |

FOREIGN PATENT DOCUMENTS

| | | |
|---|---|---|
| JP | 58034302 | 2/1983 |
| JP | 6022614 | 2/1985 |
| WO | 2005022098 | 3/2005 |
| WO | 2008095158 | 8/2008 |

OTHER PUBLICATIONS

Great Britain Search Report dated May 29, 2013 in Great Britain Application No. GB1301918.7.
International Search Report for International Application No. PCT/GB2014/050302 dated May 20, 2014.
Combined Search and Examination Report dated May 30, 2013 for Great Britain Application No. GB1301918.7.

* cited by examiner

DEFORMATION DETECTION TOOL AND METHOD FOR DETECTING DEFORMATION

This application is a U.S. National Phase application of PCT International Application No. PCT/GB2014/050302, filed Feb. 4, 2014, which claims the benefit of GB 1301918.7, filed Feb. 4, 2013, both of which are incorporated herein by reference.

BACKGROUND TO THE INVENTION

It is common in many areas of engineering for analysis engineers to size the structural components of a structure or apparatus such that during normal operation the components will not permanently deform, but should the structure experience a load higher than those of normal operation (overload) the components permanently yield and undergo permanent deformation. If detectable the permanent deformation provides an indication to operators or maintenance staff that the structure has experienced above normal loads, allowing further safety checks to be carried out as appropriate.

One such area of engineering is in the aerospace industry and in particular concerning aircraft landing gear. Almost without exception every aircraft landing gear includes at least one pin joint pivotally attaching one component to another, with the pin joint being included in at least one load path of the landing gear. If subject to an overload the pin of the pin joint will permanently bend. However, the amount of bending may be relatively small and therefore difficult to determine just from a visual inspection. Consequently, the deformation may remain undetected which in turn may cause unexpected failure of the landing gear.

SUMMARY OF THE INVENTION

According to a first aspect of the present invention there is provided a tool for detecting deformation of a nominally straight element, the tool including a first body element having first straight edge, means for biasing the first straight edge against the straight element, and a light source arranged to illuminate any space present between the straight element and the first straight edge of the first body element. The illumination of the any space makes it significantly easier to identify the existence of that space, and hence deformation of the nominally straight element, by visual inspection alone, thus speeding up the inspection process.

The tool may include a second body element connected to the first body element, the first and second body elements arranged to slide over each other. The second body element preferably has a second straight edge parallel to the first straight edge of the first body element. This allows opposite sides of a hollow element in which the tool has been inserted to be inspected at the same time.

The biasing means may be arranged to bias the first and second body elements away from each other. This may be advantageous if the tool is to be placed within a confined space as the tool is likely to remain in place without additional support.

The biasing means preferably comprises at least one spring.

The light source preferably comprises at least one LED.

According to a second aspect of the present invention there is provided a method of detecting deformation of a nominally straight element, the method including biasing a first body element having a first straight edge against the straight element, illuminating the first straight edge from a first side of the first body element by means of a light source mounted on the first side of the body element and viewing the first straight edge from the opposite side of the straight edge to detect the passage of any light from the light source between the nominally straight element and the first straight edge of the first body element.

The nominal straight element may comprise the interior surface of a hollow joint pin and the step of biasing the first straight edge against the straight element comprises locating the first body element within the hollow pin.

According to a third aspect of the present invention there is provided an aircraft landing gear assembly including at least two elongate members pivotally connected about a hollow joint pin, and further including a tool according to the first aspect of the invention located within the joint pin.

BRIEF DESCRIPTION OF THE DRAWINGS

Embodiments of the present invention are described below, by way of non-limiting example only, with reference to the accompanying figures, of which.

DETAILED DESCRIPTION OF THE INVENTION

Whilst the following embodiments of the present invention are described in relation to their application to aircraft landing gear, it will be appreciated that the present invention is not limited to such applications.

Figure 1:
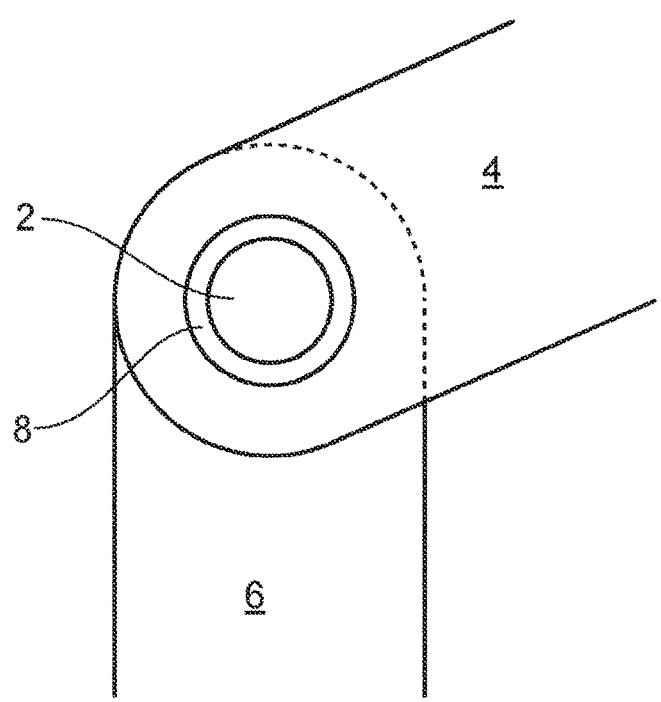
FIG. 1 schematically illustrates a pin joint pivotally connecting two components of an aircraft landing gear.
Figure 2:
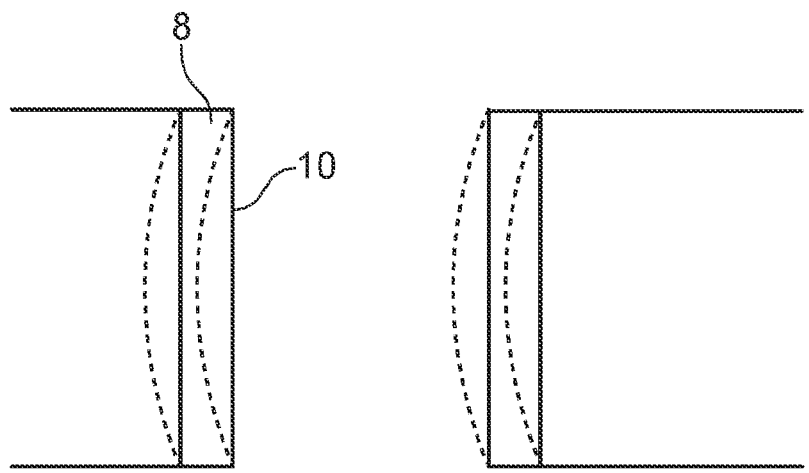
FIG. 2 schematically illustrates a cross section of the pin joint of FIG. 1.

FIG. 1 schematically illustrates a pin joint 2 connecting two elements 4, 6 of an aircraft landing gear. The pin joint includes a hollow, cylindrical pin 8 about which the landing gear elements can pivot. FIG. 2 shows a cross section through the pin 8 of the pin joint 2. The solid lines represent the pin 8 as manufactured with the internal bore of the pin (and therefore the internal bore surfaces 10 of the pin) being straight, due to the tightly controlled tolerances used during the manufacture of the landing gear. However, when the pin is subjected to an overload the pin will permanently bend, as indicated in FIG. 2 by the broken lines.

Figure 3:
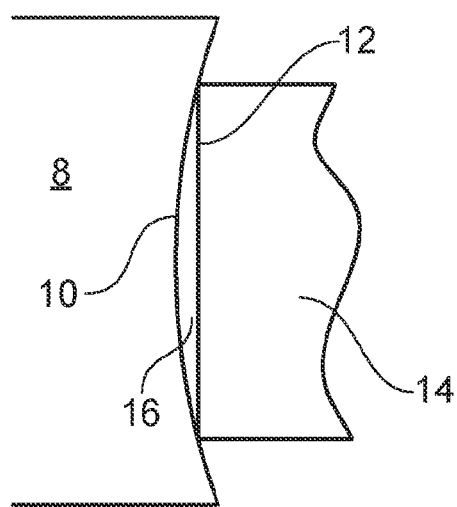
FIG. 3 schematically illustrates a detail of a bent pin joint.

FIG. 3 schematically illustrates the principle of the present invention. A portion of the pin 8 is shown, the pin being bent after being subjected to an overload, as represented by the solid curved line indicating the internal surface 10 of the pin bore.

Also illustrated is the straight edge 12 of an inspection tool 14 that has been placed inside the pin. The straight edge 12 is in contact with the internal surface of the pin. The curvature of the bent pin relative to the straight edge 12 of the inspection tool results in a space 16 between the pin and the straight edge. The presence of the this space provides a clear visual indication of the permanent deformation of the pin. However, in practice the space 16 resulting from the deformation of the pin is small and is difficult to identify unaided with the human eye.

Figure 4:
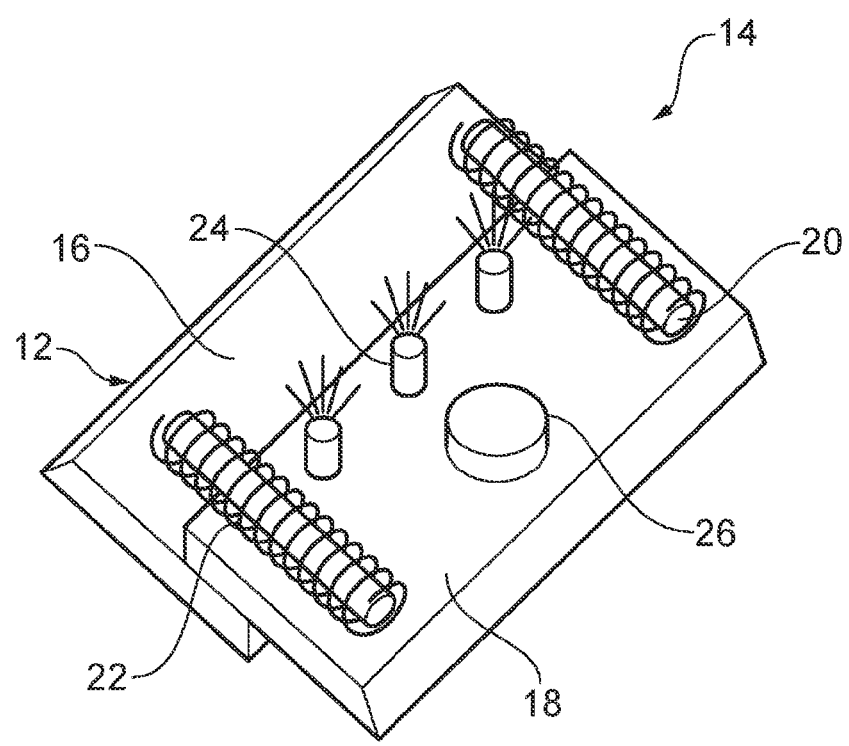
FIG. 4 schematically illustrates an inspection device according to an embodiment of the present invention.

FIG. 4 illustrates an inspection tool 14 according to an embodiment of the present invention. The inspection tool 14 includes a first body element 16 having a straight edge 12.

The first body element is substantially planar. A second body element 18 is connected to the first body element 16, with at least a portion of the two body elements overlapping. The second body element 18 is connected to the first body element by means of two guide rails 20 such that the two body elements can slide relative to each other. The body elements are biased apart from each other by a spring 22 mounted around each guide rail 20. Mounted on a surface of the second body element 18 are one or more light sources 24 powered by a battery 26, also mounted on the second body element.

Figure 5:
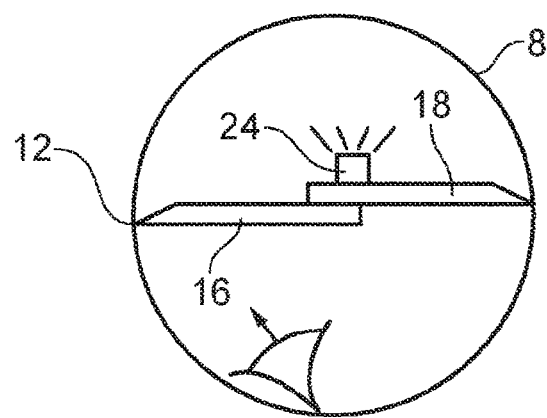
FIG. 5 schematically illustrates the inspection device of FIG. 4 in use.

FIG. 5 schematically illustrates the inspection tool shown in FIG. 4 in use. The tool is inserted within a bore of a hollow cylindrical pin 8 to be inspected. The first and second body elements 16, 18 are biased apart by the springs 22 such that the straight edge 12 of the first body element 16 is biased into contact with the inner surface of the pin 8. When inspected from the opposite side of the inspection tool 14 from which the light source 24 is mounted on, any spaces caused by deformation of the pin 8 between the surface of the pin and the straight edge 12 will be more easily visible because any such spaces will allow the light from the light source 24 to be visible.

In other embodiments of the present invention the first and second body elements 16, 18 are biased apart using a resilient member other than a spring 22. Alternatively, the body elements are arranged to be manually slid apart with a ratchet arrangement preventing the body elements sliding back together unless the ratchet is released.

Equally, in other embodiments the second body element 18 is replaced with one or more separate biasing members arranged to directly engage with the inner surface of the pin bore 8 and bias the straight edge 12 of the first body element 16 against the pin surface during use. In such embodiments the light source(s) 24 and corresponding power source 26 is mounted on the first body element 16.

The light source(s) and/or battery can be mounted on either of the first and second body elements. The light sources can be filament bulbs, LEDs, electroluminescent elements or any other source of illumination. Depending on the kind of light source the battery 26 can be omitted. In other embodiments the battery can be replaced with any other suitable power source, such a solar panel or fuel cell. The second body element can also include a second straight edge to allow separate sections of the pin 8 to be simultaneously inspected.

The invention claimed is:

1. A method of detecting deformation of a nominally straight element, the method comprising:
   biasing a first body element having a first straight edge with the first straight edge against the nominally straight element;
   illuminating the first straight edge from a first side of the first body element by a light source located on the first side of the body element; and
   viewing the first straight edge from a second side of the first body element to detect the passage of any light from the light source between the nominally straight element and the first straight edge of the first body element;
   wherein the nominally straight element comprises the interior surface of a hollow joint pin and the step of biasing the first straight edge against the nominally straight element comprises locating the first body element within the hollow pin.

2. The method of claim 1, wherein:
   the first body element is slidably connected to a second body element;
   a spring is operatively associated with the first body element and the second body element to bias the first straight edge away from the second body element; and
   the step of biasing the first straight edge against the nominally straight element comprises locating the first body element within the hollow pin and allowing the spring to bias the first straight edge away from the second body element.

3. The method of claim 2, wherein the second body element comprises a second straight edge parallel to the first straight edge of the first body element, and the method further comprises viewing the second straight edge to detect the passage of any light from the light source between the nominally straight element and the second straight edge.

4. An aircraft landing gear assembly and tool kit comprising:
   an aircraft landing gear assembly including at least two elongate members pivotally connected about a hollow joint pin; and
   a tool located within the joint pin, the tool comprising:
   a first body element having a first straight edge;
   a second body element connected to the first body element and arranged to move relative to the first body element;
   means for biasing the first straight edge away from the second body element and against a nominally straight element within the pin joint; and
   a light source arranged on a first side of the first body element to illuminate any space present between the nominally straight element and the first straight edge of the first body elemen

* * * * *

UNITED STATES PATENT AND TRADEMARK OFFICE
CERTIFICATE OF CORRECTION

PATENT NO. : 9,816,806 B2  
APPLICATION NO. : 14/765444  
DATED : November 14, 2017  
INVENTOR(S) : Chris Green et al.

Page 1 of 1

It is certified that error appears in the above-identified patent and that said Letters Patent is hereby corrected as shown below:

In the Claims

At Column 4, Line 49, in Claim 4, "elemen" should read -- element --

Signed and Sealed this  
Fifth Day of June, 2018

Andrei Iancu  
*Director of the United States Patent and Trademark Office*